Figure 1:
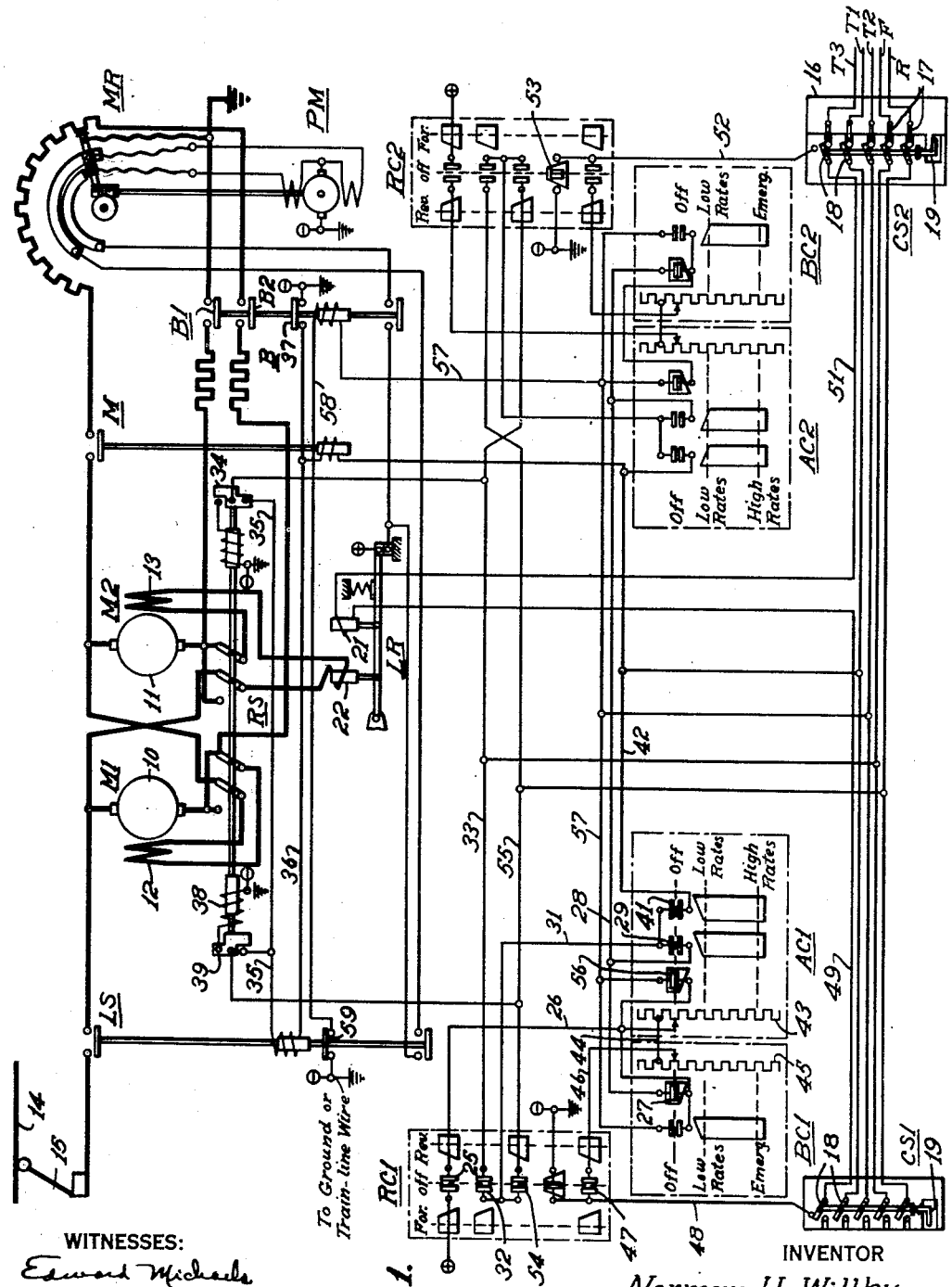

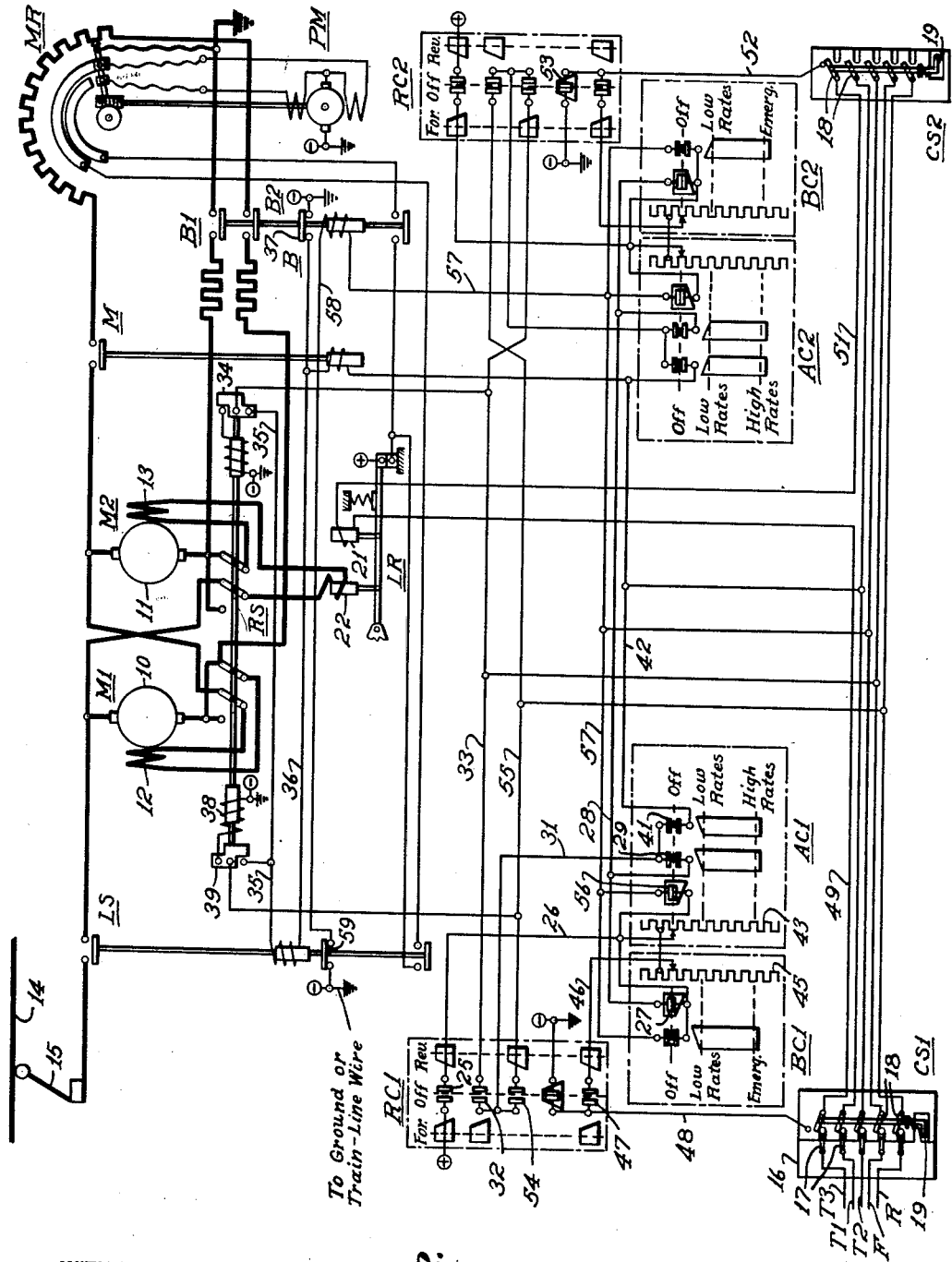

Patented Feb. 2, 1943

2,310,141

UNITED STATES PATENT OFFICE 2,310,141

MOTOR CONTROL SYSTEM

Norman H. Willby, Irwin, Pa., assignor to Westinghouse Electric & Manufacturing Company, East Pittsburgh, Pa., a corporation of Pennsylvania Application October 18, 1941, Serial No. 415,585

15 Claims. (Cl. 172—179)

My invention relates, generally, to motor control systems and, more particularly, to systems for controlling the operation of the driving motors for electrically-propelled vehicles.

It is frequently desirable to operate electrically-propelled vehicles in multiple, for example in trains consisting of two or more cars in each train. The train is controlled from the front end of the head car and it is essential that all cars be so equipped that any car may be placed in any position in the train and operated in either direction. Furthermore, it is essential that the motors in all cars accelerate and dynamically brake at the same rate in order to obtain smooth operation of the train.

An object of my invention, generally stated, is to provide a motor control system which shall be simple and efficient in operation and which may be economically manufactured and installed.

A more specific object of my invention is to provide for the multiple operation of electrically-propelled vehicles.

Another object of my invention is to provide for obtaining variable rates of acceleration and dynamic braking of electrically-propelled vehicles which are operated in multiple.

A further object of my invention is to provide for accelerating and dynamically braking each car of a multi-car train at the same rate as the other cars of the train.

Still another object of my invention is to provide a current limit relay which is not affected by a reversal in the direction of flow of current through its windings.

Other objects of my invention will be explained fully hereinafter or will be apparent to those skilled in the art.

In accordance with my invention, variable rates of acceleration and dynamic braking of cars operated in multiple are obtained by connecting all of the loading coils on the current limit relays on the cars in series-circuit relation through a single train line wire, thereby insuring that all coils receive the same current. The current in the coils is controlled by a variable rheostat from the operating controller at the head end and is grounded at the rear of the train. The loading coil on each limit relay is disposed on a different magnetic circuit from the actuating coil. Thus, current in the loading coil in either direction produces the same effect on the relay and the car can be turned end for end in the train.

For a fuller understanding of the nature and objects of my invention, reference may be had to the following detailed description, taken in conjunction with the accompanying drawings in which:

Figures 1 and 2, when combined, constitute a control system embodying my invention.

Referring now to the drawings, and particularly to Fig. 1, the system shown therein comprises a pair of motors M1 and M2 having armature windings 10 and 11 and series field windings 12 and 13, respectively, a line switch LS for connecting the motors to a power conductor 14 through a current collector 15 and a switch M for connecting the motors to a variable rheostat MR which controls the motor current during acceleration and dynamic braking in the usual manner. The rheostat MR is operated by a pilot motor PM and a current limit relay LR is provided for automatically controlling the operation of the pilot motor. A switch B, having contact members B1 and B2, is provided for establishing dynamic braking connections for the motors M1 and M2. The direction of rotation of the motors is controlled by a reversing switch RS.

Reversing controllers RC1 and RC2 are provided for controlling the operation of the reversing switch RS. One of the controllers is located at each end of the vehicle and they are so connected in the control system that either controller may be utilized, depending upon which direction the vehicle is operating.

Accelerating controllers AC1 and AC2 are provided for controlling the acceleration of the vehicle. Braking controllers BC1 and BC2 control the dynamic braking of the vehicle. An accelerating controller and a braking controller are located at each end of the vehicle, thereby enabling the proper controllers to be selected to control the vehicle from its head end when operating at the head of a train of vehicles. In case a vehicle is not the leading vehicle of a train, the controllers on that particular vehicle are not utilized. Thus, a vehicle may be operated in either direction and in any position in a train of vehicles.

A plurality of train-line wires are provided for establishing the control connections between vehicles. Coupling switches CS1 and CS2 are provided for completing the connections between the train-line wires when the vehicles are coupled together. A jumper cable 16 having contact members 17 suitable for insertion into the coupler switches may be utilized to extend the train-line connections from one vehicle to another. As shown, the coupler switches are provided with contact members 18 which are actuated to the closed position by a bar 19 when the head of a jumper cable 16 is inserted into the coupler switch thereby establishing the connections between the train-line wires and the jumper cable.

In order to vary the rates of dynamic braking and acceleration of the vehicle, the limit relay LR is provided with a loading coil 21 in addition to the usual actuating coil 22 which is connected in the motor circuit and energized by the motor current. The loading coil 21 is energized from a separate source of power, such as a battery, and its energization is controlled by either one of the accelerating controllers or by either one of the braking controllers. An adjustable rheostat is provided for each one of the controllers and the loading coil current is varied by the position of the controller being utilized to control the train.

In order to insure that all the motors of a train will accelerate and brake at the same rate all of the loading coils are connected in series-circuit relation by a single train-line wire. Thus, the same current flows through all loading coils, thereby similarly adjusting the setting of all the limit relays to operate at the same current values. In this manner the limit relays all function in exactly the same manner and are not affected differently by heating of the coils, variations in the controlling rheostat or variations in the resistance of the train-line wire. Smooth operation of the train is obtained since all of the motors will accelerate or dynamically brake at the same rate and no bucking between the cars of the train is produced.

In order that the operation of the limit relays will not be affected by a reversal in the direction of current flow through the loading coil as a result of the vehicle being turned end for end in the train, the loading coil 21 is disposed on a different magnetic circuit from the actuating coil 22. Thus, the magnetic action of the coil 21 is independent of the actuating coil 22 and the relay is so constructed that its operation is not affected by reversal of the current in either one of its windings.

The equipment shown in Fig. 2 is a duplicate of that shown in Fig. 1 and is included herein in order to illustrate more clearly the operation of the system when two or more vehicles are connected together in a train. It will be understood that the equipment on each vehicle is the same and that any number of vehicles may be connected together for multiple operation. Furthermore, any one of the vehicles may be placed at the head of the train or in any other position in the train.

In order that the functioning of the apparatus may be more clearly understood the operation of the system will now be described in more detail. Assuming that the equipment illustrated in Fig. 1 is located in the first car of a train which is operating in such a direction that the controllers RC1, BC1 and AC1 are at the head of the train, the train may be accelerated by actuating the reversing controller RC1 to the forward position and the accelerating controller AC1 to any one of the accelerating positions, depending upon the rate of acceleration desired. In this manner the switches LS and M are closed to connect the motors across the power source. The energizing circuit for the switch LS may be traced from positive through contact members 25 of the reversing controller RC1, conductor 26, contact members 27 of the braking controller BC1, conductor 28, contact members 29 of the accelerating controller AC1, conductor 31, contact members 32 of the reversing controller RC1, conductor 33, an interlock 34 on the reversing switch RS, conductor 35, the actuating coil of the switch LS, conductor 36 and an interlock 37 on the switch B to ground.

It will be noted that the switch LS is so interlocked with the reversing switch RS that the switch LS cannot be closed unless the reversing switch is thrown to the proper position for the desired direction of operation of the vehicle. In the present instance, the reversing switch is shown in the forward position. Should it be necessary to reverse the direction of rotation of the motors, an actuating coil 38 would be energized through an interlock 39 prior to the energization of the line switch LS. In this manner the reversing switch RS would be thrown to the reversing position before the closing of the line switch, thereby avoiding injury to the contact members of the reversing switch.

At this time the switch M is closed to complete the motor connections across the power source. The energizing circuit for the switch M may be traced from contact members 41 on the controller AC1, through the conductor 42, the actuating coil of the switch M, conductor 36 and the interlock 37 on the switch B to ground. In this manner all the motors of the train are simultaneously connected across the power source since the train-line wires T1, T2, F and R establish the proper connections throughout the train for performing the necessary switching operations.

As explained hereinbefore, the loading coils of all the limit relays LR are connected in series-circuit relation, this connection being established by a train-line wire T3. Thus, the loading coil current is controlled by a variable resistor 43 which is adjusted in accordance with the position of the controller AC1 to vary the rate of acceleration of the vehicles. The energizing circuit for the loading coil 21 may be traced from positive through contact members 25 of the reversing controller RC1, conductor 26, the resistor 43, conductor 44, a small portion of a resistor 45 which normally controls the dynamic braking rate, conductor 46, contact members 47 on the controller RC1, conductor 48, the coupler switch CS1, conductor 49, the loading coil 21, conductor 51, the coupler switch CS2 and the train-line wire T3 to the coupler switch CS1 on the vehicle having the equipment shown in Fig. 2.

Since the contact members of the coupler switch CS1 on the second vehicle are closed by the insertion of the jumper cable for the train-line wires, the circuit continues through conductor 49, and the loading coil 21 of the relay on the second vehicle through conductor 51 to the coupler switch CS2. The contact members of this switch are in the raised position since it is assumed that this is the last car of the train and no jumper cable is inserted in this coupler switch. Therefore the loading coil circuit is conducted through the uppermost contact member 18 to conductor 52 and contact members 53 of the reversing controller RC2 to ground. In this manner all of the loading coils are connected in series-circuit relation and the loading coil current is controlled by the controller selected for controlling the operation of the train.

Since all of the loading coils are in series-circuit relation the same current flows through all the coils irrespective of variations in the resistance of any one coil or in the connections throughout the train. Thus, all coils function in the same manner to change the setting of all the limit relays which, in turn, control the operation of the pilot motors PM for operating the rheostats MR which control the motor current during acceleration of the vehicle.

The operation of a limit relay to control a motor operated rheostat or accelerator is well known in the art and it is believed to be unnecessary to describe this operation in detail. Briefly, the pilot motor PM is energized through the contact members of the limit relay to operate the rheostat to reduce the resistance in the motor circuit as the motors increase in speed and build up a counter electromotive force to reduce the motor current below the setting of the current limit relay. As explained hereinbefore, the motor current at which the relay operates may be changed by varying the current in the loading coil of the relay.

If it is necessary to reverse the direction of rotation of the motors M1 and M2, the accelerating controller AC1 and the braking controller BC1 are returned to the "off" position and the reversing controller RC1 is actuated to the reverse position, the line switch LS being deenergized when the controllers are in the "off" position. When the reversing controller RC1 is in the reverse position the solenoid coil 38 on the reversing switch RS is energized to operate the reversing switch to reverse the connections of the field windings 12 and 13 with respect to the armature windings 10 and 11 of the motors M1 and M2, respectively. When the controller AC1 is actuated to one of the accelerating positions the energizing circuit for the solenoid coil 38 may be traced from positive through contact members 25 of the reversing controller RC1, conductor 26, contact members 27 of the braking controller BC1, conductor 28, contact members 29 of the accelerating controller AC1, conductor 31, contact members 54 of the reversing controller RC1, conductor 55, the interlock 39 and the solenoid coil 38 to ground.

Following the operation of the reversing switch RS, the line switch LS is operated to connect the motors across the power source, the switch M having been closed as explained hereinbefore. The circuit for the actuating coil for the switch LS extends from the interlock 39 on the reversing switch RS through conductor 35, the actuating coil of the switch LS, conductor 36 and the interlock 37 on the switch B to ground. In this manner the switch LS cannot be closed to energize the motor circuit until after the reversing switch RS has completed its operation.

-If it is desired to retard the motion of the vehicle by dynamic braking of the motors M1 and M2, the accelerating controller AC1 is returned to the "off" position and the braking controller BC1 is actuated to one of the braking positions, depending upon the rate of braking desired. When the controller AC1 is returned to the "off" position, the switches LS and M are deenergized to disconnect the motors from the power source. When the controller BC1 is actuated to a braking position the switch B is closed to establish the dynamic braking connections. The energizing circuit for the actuating coil of the switch B may be traced from positive through contact members 25 of the reversing controller RC1, conductor 26, contact members 56 on the controller AC1, conductor 57, the actuating coil of the switch B, conductor 58 and interlock 59 on the switch LS to ground.

The closing of the switch B connects the field winding 12 of the motor M1 across the armature 11 of the motor M2 and the field winding 13 of the motor M2 across the armature 10 of the motor M1 to cause the motors to function as generators and circulate a current through the rheostat MR, thereby retarding the motion of the vehicle in a manner well known in the art. The braking current is controlled by the rheostat MR, the operation of which is controlled by the limit relay LR in the same manner as during acceleration of the vehicle.

The current in the loading coil 21 is controlled by the position of the controller BC1 which may be changed to vary the rate of braking. Since the loading coils 21 on all vehicles are connected in series-circuit relation, the setting of all the limit relays is the same, thereby causing all vehicles to be braked at the same rate to insure smooth operation of the train. When the train is stopped, the controller BC1 is returned to the "off" position and the equipment is then ready for acceleration of the vehicle.

As explained hereinbefore, the operation of the train may be controlled by the controllers AC2, BC2 and RC2 in the same manner as herein described for the controllers AC1, BC1 and RC1. In case the controllers AC2, BC2, and RC2 are at the head of the train, the jumper cable 16 may be connected to the coupler switch CS1 instead of to the switch CS2 thereby causing the contact members of the switch CS1 to establish the connections through the train-line wires. The upper contact member 18 of the switch CS2 will then engage the conductor 52 to establish the energizing circuit for the loading coils 21. As explained hereinbefore the circuit for the loading coils is connected to ground through the last controller RC2 on the train.

From the foregoing description it is apparent that I have provided a system which is suitable for controlling the operation of multi section trains, consisting of two or more electrically-propelled vehicles or cars, in which each car is equipped with propelling motors and control equipment. Furthermore, the system is such that each car may be operated in either diretcion and in any position in the train. The present system provides for the proper operation of the equipment regardless of the direction of motion of the car and also prevents bucking or uneven acceleration or braking between the different cars of the train, thereby insuring smooth operation of the train.

Since many modifications may be made in the apparatus and arrangement of parts without departing from the spirit of my invention, I do not wish to be limited other than by the scope of the appended claims.

I claim as my invention:

1. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, all of said loading coils being connected in series-circuit relation, and means for energizing said series circuit through said loading coils.

2. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, a train-line wire for connecting all of said loading coils in series-circuit relation, and means for energizing said series circuit through said loading coils.

3. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, and means for circulating the same current through all of said loading coils.

4. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, means for circulating the same current through all of said loading coils, and means for varying the current in said loading coils.

5. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, means for circulating the same current through all of said loading coils, and means on one of said vehicles for varying the current in all of said loading coils.

6. In a motor control system the combination with a plurality of electrically-propelled vehicles of a motor for driving each one of the vehicles, means on each vehicle for controlling the motor current, a current limit relay on each vehicle for controlling the operation of said means, a loading coil on each relay for adjusting the relay, means for circulating the same current through all of said loading coils, and selectable means on each vehicle for varying the current in said loading coils.

7. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, means for circulating the same current through all of said loading coils, and a pair of controllers on each vehicle for varying the loading coil current, any one of said controllers being selectable to vary the current in all of said loading coils.

8. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, a train-line wire for connecting all of said loading coils in series-circuit relation, coupling switches on each vehicle for connecting the train-line wire, and means for energizing said series circuit through said loading coils.

9. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, a train-line wire for connecting all of said loading coils in series-circuit relation, coupling switches on each vehicle for connecting the train-line wire, and selectable controllers on each vehicle for varying the loading coil current.

10. In a motor control system the combination with a plurality of electrically-propelled vehicles, of a motor for driving each one of the vehicles, means on each vehicle for controlling the motor current, a current limit relay on each vehicle for controlling the operation of said means, a loading coil on each relay for adjusting the relay, a train-line wire for connecting all of said loading coils in series-circuit relation, coupling switches on each vehicle for connecting the train line wire, and selectable controllers on each vehicle for varying the loading coil current, said coupling switches and one of said selectable controllers cooperating in the energization of all of said loading coils.

11. In a motor control system, the combination with a plurality of electrically-propelled vehicles, of a motor for driving each one of the vehicles, means on each vehicle for controlling the motor current, a current limit relay on each vehicle for controlling the operation of said means, an actuating coil on each relay responsive to the motor current, a loading coil on each relay, all of said loading coils being connected in series-circuit relation, and means for energizing said loading coils independently of the motor current.

12. In a motor control system, the combination with a plurality of electrically-propelled vehicles, of a motor for driving each one of the vehicles, means on each vehicle for controlling the motor current, a current limit relay on each vehicle for controlling the operation of said means, an actuating coil on each relay responsive to the motor current, a loading coil on each relay, said loading coil being on a different magnetic circuit from the actuating coil, and means for energizing said loading coils independently of the motor current.

13. In a motor control system, the combination with a plurality of electrically-propelled vehicles, of a motor for driving each one of the vehicles, means on each vehicle for controlling the motor current, a current limit relay on each vehicle for controlling the operation of said means, an actuating coil on each relay responsive to the motor current, a loading coil on each relay, said loading coil being on a different magnetic circuit from the actuating coil, all of said loading coils being connected in series-circuit relation, and means for energizing said loading coils independently of the motor current.

14. In a motor control system, the combination with a plurality of electrically-propelled vehicles, of a motor for driving each one of the vehicles, means on each vehicle for controlling the motor current, a current limit relay on each vehicle for controlling the operation of said means, an actuating coil on each relay responsive to the motor current, a loading coil on each relay, said loading coil being on a different magnetic circuit from the actuating coil, all of said loading coils being connected in series-circuit relation, means for energizing said loading coils independently of the motor current, and selectable controllers on each vehicle for varying the loading coil current.

15. In a motor control system, the combination with a plurality of electrically-propelled vehicles, of a motor for driving each one of the vehicles, means on each vehicle for controlling the motor current, a current limit relay on each vehicle for controlling the operation of said means, an actuating coil on each relay responsive to the motor current, a loading coil on each relay, said loading coil being on a different magnetic circuit from the actuating coil, all of said loading coils being connected in series-circuit relation, means for energizing said loading coils independently of the motor current, reversing controllers for controlling the direction of rotation of the motor, and selectable controllers cooperating with the reversing controllers in controlling the loading coil current.

NORMAN H. WILLBY.